US009010455B2

(12) United States Patent
Jung et al.

(10) Patent No.: US 9,010,455 B2
(45) Date of Patent: Apr. 21, 2015

(54) ACTUATION APPARATUS FOR POWER TOOL

(75) Inventors: Achim Jung, Armsheim (DE); René Jäger, Karben (DE); Ian S. Bell, Sunninghill (GB)

(73) Assignee: Black & Decker Inc., Newark, DE (US)

( * ) Notice: Subject to any disclaimer, the term of this patent is extended or adjusted under 35 U.S.C. 154(b) by 1010 days.

(21) Appl. No.: 12/357,152

(22) Filed: Jan. 21, 2009

(65) Prior Publication Data

US 2009/0126962 A1 May 21, 2009

Related U.S. Application Data

(63) Continuation of application No. 11/359,167, filed on Feb. 22, 2006, now abandoned.

(30) Foreign Application Priority Data

Feb. 22, 2005 (GB) .................................. 0503558.9

(51) Int. Cl.
*B23Q 5/00* (2006.01)
*B25D 16/00* (2006.01)
*H01H 9/06* (2006.01)

(52) U.S. Cl.
CPC ...... *B25D 16/006* (2013.01); *B25D 2216/0015* (2013.01); *B25D 2216/0023* (2013.01); *B25D 2216/0038* (2013.01); *B25D 2250/221* (2013.01); *B25D 2250/261* (2013.01); *H01H 9/06* (2013.01)

(58) Field of Classification Search
USPC .......... 173/2, 4, 11, 117, 20, 47, 48; 388/809, 388/937
See application file for complete search history.

(56) References Cited

U.S. PATENT DOCUMENTS

| | | | | | |
|---|---|---|---|---|---|
| 4,879,438 | A | * | 11/1989 | Winchester | 200/61.85 |
| 5,105,130 | A | * | 4/1992 | Barker et al. | 318/268 |
| 6,150,632 | A | * | 11/2000 | Fisher | 219/137.71 |

* cited by examiner

*Primary Examiner* — Hemant M Desai
*Assistant Examiner* — Nathaniel Chukwurah
(74) *Attorney, Agent, or Firm* — Gabriel A. Haboubi

(57) ABSTRACT

When the mode change knob of a multi-mode hammer drill is moved to the hammer only position, an electronic sensor sends a signal to a control logic circuit. When the user then depresses the trigger mechanically closing the ON/OFF switch, the control logic circuit applies a voltage either to a holding relay or to the gate of a triac which enables the relay or triac to conduct, thus providing a parallel circuit by-passing the ON/OFF switch. Consequently, when the user releases the trigger and opens the ON/OFF switch, the parallel relay or triac maintains current flow to the motor. It can be seen that in hammer only mode the user can activate the hammer drill by simply tapping the trigger to depress it and does not need to hold down trigger during use of the hammer in operation.

13 Claims, 3 Drawing Sheets

ACTUATION APPARATUS FOR POWER TOOL

REFERENCE TO RELATED CASES

This application is a continuation of U.S. patent application Ser. No. 11/359,167 filed in the U.S. on Feb. 22, 2006, now abandoned the contents of which are incorporated herein in their entirety by reference, which claims priority from UK Application No. GB 05 035 58.9, filed in the United Kingdom on Feb. 22, 2005, the contents of which are incorporated herein in their entirety by reference.

FIELD OF THE INVENTION

The present invention relates to an actuation apparatus for a power tool. In particular, the invention relates to a hammer drill. The invention relates more particularly, but not exclusively to an actuation apparatus for the trigger of a power tool and to a power tool incorporating such an apparatus.

BACKGROUND OF THE INVENTION

Hammer drills are power tools that generally have three modes of operation, i.e. a hammer only mode, a drill only mode and a combined hammer and drilling mode. In general, the motor of a hammer drill is operated by the user depressing a spring-loaded trigger, and deactivated by the user releasing the trigger such that it is necessary to hold the trigger down during operation of the tool.

UK patent no. 2314288 describes an electric combination hammer having a drilling mode and a chiseling mode. The hammer comprises a housing with a handle and a trigger disposed on the handle for operating an electric on/off switch. The combination hammer has an operating knob for switching manually between the drilling mode and the chiseling mode, and the trigger has an associated detent which, when the operating knob is in the position corresponding to the chiseling mode, allows the on/off switch to be latched in a closed position such that even when the user releases their grip on the trigger the combination hammer remains in operation.

The electric combination hammer of GB2314288 suffers from the drawback that the components for the detent system are mechanical in nature, comprising cam surfaces and resilient springs, such that they are susceptible to wear and tear with repeated use. Also, the use of such mechanical components makes the hammer expensive to manufacture.

Preferred embodiments of the present invention seek to overcome the above disadvantage of the prior art.

BRIEF SUMMARY OF THE INVENTION

According to an aspect of the present invention, there is provided an actuation apparatus for a power tool having a housing, a motor with a rotary output shaft disposed in the housing, drive means for driving a working member of the tool in response to rotation of said rotary output shaft, and a trigger disposed on the housing to enable activation of said motor, the actuation apparatus comprising:

switching means for enabling a user to select between a hammer mode of said tool, a drilling mode of said tool and/or hammer and drilling mode of said tool;

detection means for providing at least one signal indicating which mode of operation of the tool has been selected; and control means for controlling operation of the motor in response to at least one said signal, such that in at least one first predetermined mode of operation of said tool, said motor is operated by a first depression of the trigger and remains activated until deactivated by a second depression of the trigger, and in at least one second predetermined mode of operation of said tool, said motor is only activated while the trigger is depressed.

By providing control means for controlling operation of the motor in response to at least one said signal, such that in at least one first predetermined mode of operation of said tool, said motor is operated by a first depression of the trigger and remains activated until deactivated by a second depression of the trigger, and in at least one second predetermined mode of operation of said tool, said motor is only activated while the trigger is depressed, this provides the advantage that the need for a mechanical detent system to latch on the trigger mechanism when a predetermined mode of operation is selected is eliminated. This is advantageous because an electronic system is not subject to mechanical wear and tear to the same extent as a mechanical system and can also be made much more compact, thus reducing the dimensions of the tool. Also, the apparatus can be manufactured more cost-effectively than apparatus incorporating a purely mechanical actuator system.

In a preferred embodiment, at least one said first predetermined mode is a hammer mode of the tool.

This provides the advantage that the operator does not have to continuously grip the trigger during the hammer mode operation of the tool, and therefore can move their hands around the body of the tool whilst it is in operation to provide a better grip.

The apparatus may further comprise on/off switch means for actuating the motor and adapted to be actuated by the trigger of the tool.

The apparatus may further comprise override switch means adapted to be closed by said control means, in response to said first depression of the trigger of the tool, when at least one predetermined said first mode is selected, such that even when the trigger is released, the motor remains in operation.

In a preferred embodiment, when at least one said first predetermined mode is selected, said control means opens said override switch means in response to a second depression of said trigger.

Said override switch means may be connected in parallel with said on/off switch means.

Said override switch means may comprise at least one triac, thyristor, FET, transistor or relay.

In a preferred embodiment, said control means includes control logic which may include a microprocessor.

In a preferred embodiment, there I further provided a sensor for providing an electrical signal to the control logic or microprocessor indicative of the condition of said on/off switching means.

Said switching means may include a rotatable knob.

According to a further aspect of the present invention, there is provided a power tool comprising a control apparatus as defined above.

In a preferred embodiment, said power tool is a hammer drill.

BRIEF DESCRIPTION OF THE DRAWINGS

A preferred embodiment of the present invention will now be described, by way of example only and not in any limitative sense, with reference to the accompanying drawings in which.

DETAILED DESCRIPTION OF THE INVENTION

The first embodiment of the present invention will now be described with reference to FIGS. 1 and 2.

Figure 1:
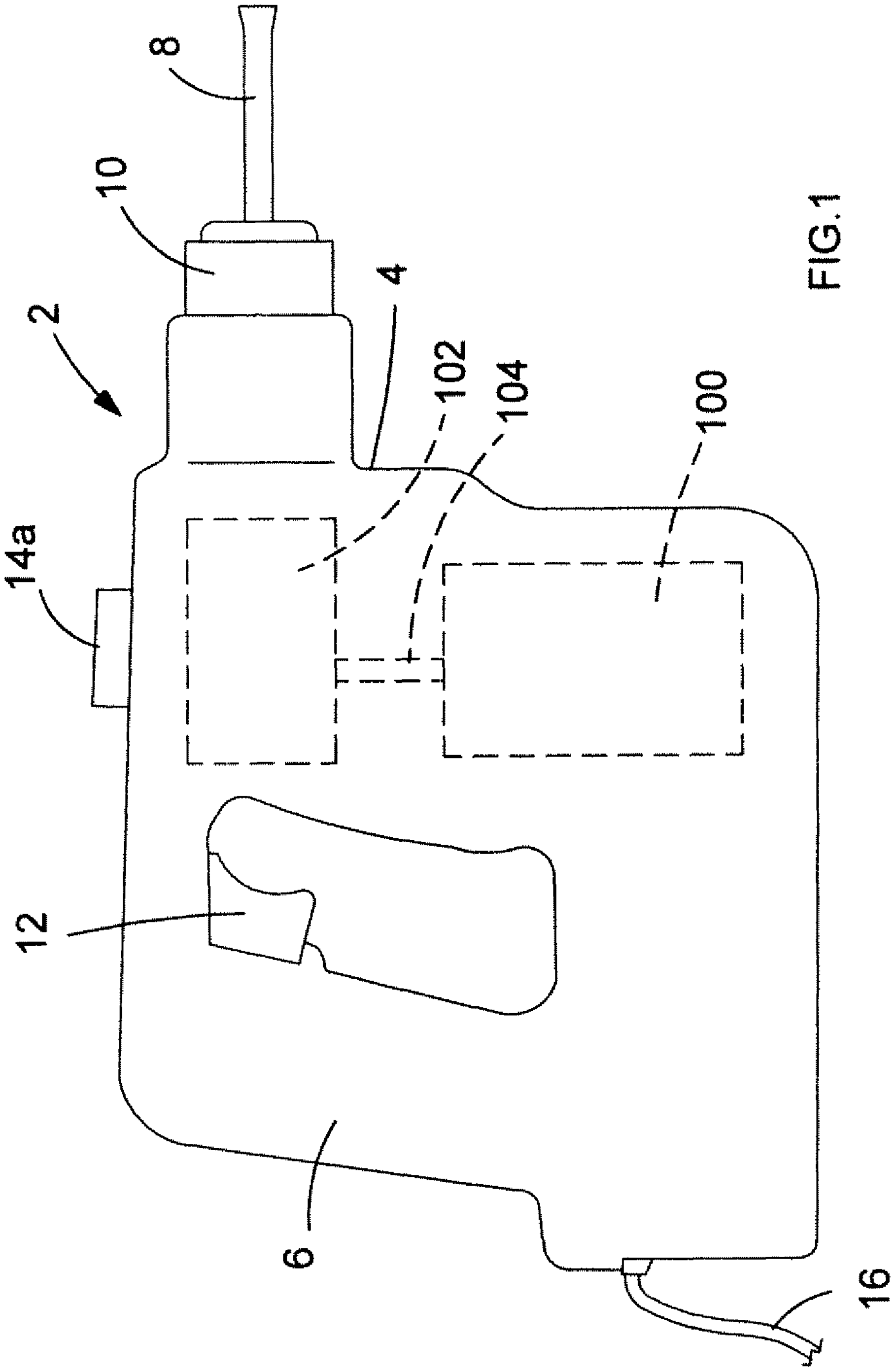
FIG. 1 is a side view of a hammer drill.

Referring to FIG. 1, a hammer drill shown generally by 2 comprises a housing 4 having a handle portion 6 for the user to grip. A motor 100 is disposed in the housing 4 which drives a drive mechanism 102 via a rotary output shaft 104, also disposed in the housing 4 and which is capable of driving a bit 8 in a drill mode, in which the bit is rotated, a hammer mode in which impacts are imparted to the bit 8, or a hammer and drill mode, in which both actions are combined. Bit 8 is held in a chuck 10 which is driveably connected to the drive mechanism 104. The operation of the drive mechanism will be familiar to persons skilled in the art and is not relevant to the understanding of the present invention, and will therefore not be described in greater detail herein.

A trigger 12 is disposed on the handle portion 6 to enable the user to activate the hammer drill 2. A mode change knob 14 is rotatably disposed on the housing 6. The mode change knob has three positions, one for hammer only mode, one for drill only mode and one for selecting combined hammer and drilling mode. When the mode change knob is rotated, it resiliently locks into one of the three positions indicating the selected mode. An electric cable 16 is attached to the housing 6 for providing electrical power to the motor. The electrical power is in the form of 230 v A.C. electrical mains power supply. However, it will be obvious to a person skilled in the art that hammer drills powered by a 120 v A.C. power supply or a D.C. power supply, such as a battery, could utilise the present invention in their construction.

Figure 2:
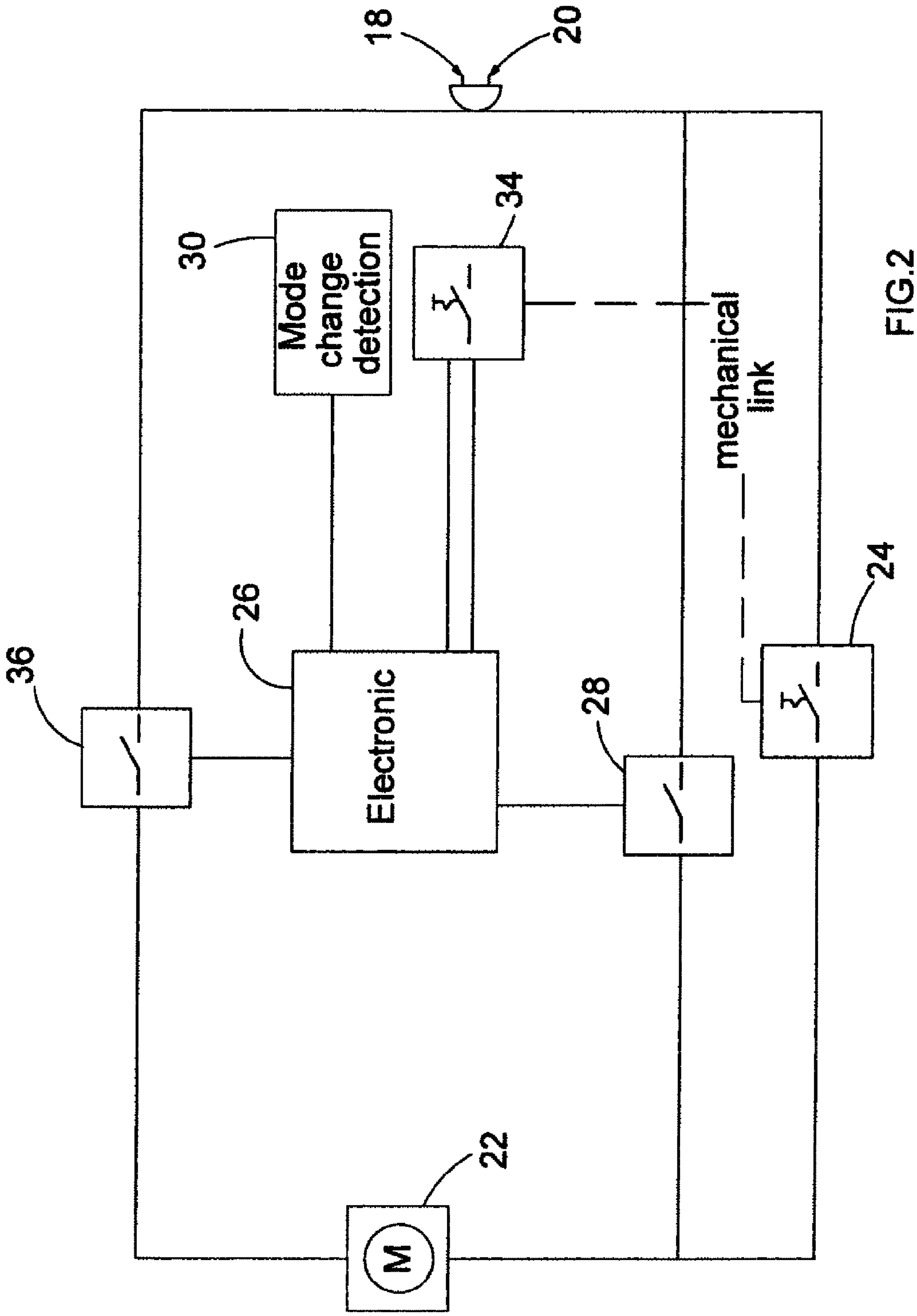
FIG. 2 is a circuit diagram of the control apparatus of the first embodiment of the present invention.

Referring to FIG. 2, the cable 16 provides a 230 v A.C. voltage across contacts 18 and 20. The electric motor 22 is controlled by an on/off switch 24 which is directly coupled to the trigger 12 such that when trigger 12 is depressed the switch 24 closes. When the trigger 12 is released, the switch 24 opens. An electronic sensor 30 detects the position of the mode change knob 14 and hence is able to determine what mode of operation the mode change knob 14 is set to. When the mode change knob 14 is in the hammer only mode position, the electronic sensor 30 sends a signal to the control logic 26 indicative that the knob 14 is set to hammer only mode. The control logic 26 is utilised to control the operation of the hammer drill, including the control of the motor 22. The control logic 26 may include a microprocessor, depending on the complexity of the control required. The control logic 26 is connected to a first electrical switch 28, for example, an electrical relay, in order to control the electrical switch 28, which electrical switch 28 is electrically connected in parallel to the switch 24.

A second switch 34 is mechanically connected to the on/off switch 24 such that when the on/off switch 24 is closed, the second switch 34 closes, and when the on/off switch 24 is opened, the second switch opens. The second switch 34 is electrically connected to the control logic 26.

The operation of the control apparatus will now be described with reference to FIGS. 1 and 2.

The mode change knob 14 allows the user to select one of the three modes in which the hammer drill can operate. When the drill only or combined hammer and drilling mode is selected, the trigger 12 is used to open and close switch 24 such that when the trigger is pressed the motor activates and drives the bit either in a rotary drilling action (drill mode) or a rotating action in which impacts are imparted to the bit 8 (hammer and drill mode). When the trigger 12 is released, the switch 24 is opened which interrupts the connection between contacts 18 and 20 and deactivates the motor.

When the mode change knob 14 is moved to the hammer only position, the electronic sensor 30 sends a signal to the control logic 26. The control logic 26 then waits for the user to depress trigger 12 closing switch 24. The control logic 26 knows the status of the on/off switch 24 due to the status of the second switch 34. When this happens, the control logic 26 applies a voltage to the second electrical switch 28 which switches the electrical switch 28 on and enables the electrical switch 28 to conduct, thus providing a parallel electrical connection bypassing the on/off switch 24. Consequently, when the user releases trigger 12 to open the switch 24, as the electrical switch 28 is in parallel with the on/off switch 24, a current continues to flow through the motor 22. It can be seen that in hammer only mode the user can activate the hammer drill by simply tapping the trigger 12 to depress it but then does not need to hold down trigger 12 to maintain operation of the motor 22 during use of the hammer in operation.

When the user depresses trigger 12 for the second time, causing the on/off switch 24 to be closed again, which in turn causes the second switch 34 to close again, which is then detected by the control logic 26, the electrical switch 28 is switched off by the control logic 26, so that no current is able to flow through the electrical switch 28, such that, when the trigger 12 is released, opening the on/off switch 24, the electrical connection between contacts 18 and 20 is interrupted and the motor 22 stops.

A second electrical switch 36 is shown in FIG. 2 in the electrical circuit between the contact 18 and the motor 22. During all modes of operation, the electrical switch 36 is normally switched on at all times by the control logic 26 to allow current to freely flow through it. However, in certain circumstances, due to safety or other operational reasons, the control logic 26 switches the second electrical switch 36 off, preventing the motor 22 from being activated by the trigger 12 when depressed.

It will be appreciated by persons skilled in the art that the above embodiment has been described by way of example only and not in any limitative sense, and that various alterations and modifications are possible without departure from the scope of the invention as defined by the appended claims.

In particular, the one press activation of the power drill has been described in connection with the hammer only mode. The power tool could be easily adapted such that this mode of operation is applied to any of the other modes of operation of the tool or any combination of the modes of operation.

In the embodiment described, the signals between electronic sensor 30, the electrical switch 24 and the control logic 26 are transmitted using electric cables or wires. However, a person skilled in the art will appreciate that the connections could be wireless e.g. the signals are transmitted using of a radio transmitter, or in the form of an optical cable or fibre.

Figure 3:
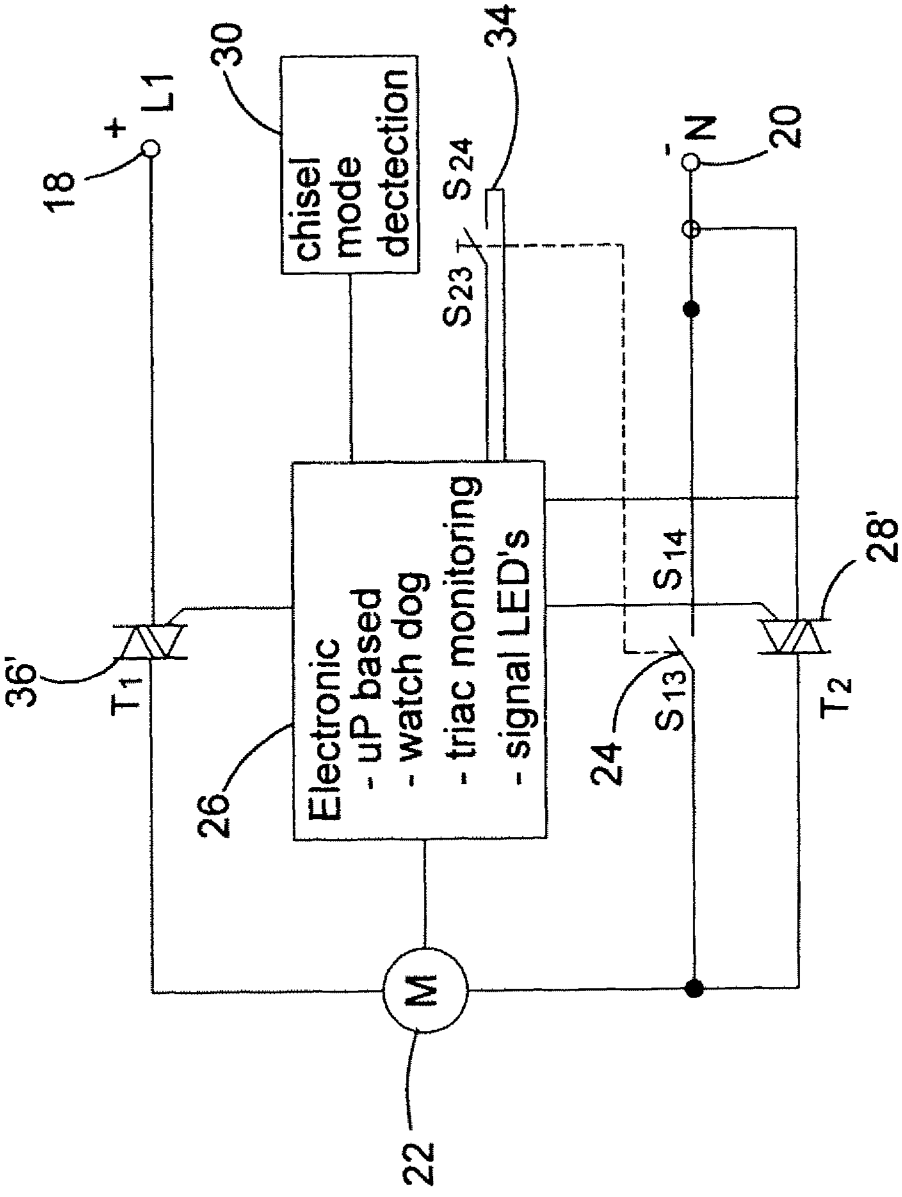
FIG. 3 is a circuit diagram of the control apparatus of the second embodiment of the present invention.

A second embodiment of the present invention will now be described with reference to FIG. 3. The design of the second embodiment is substantially the same as that of the first embodiment. Where the same features are present in the second embodiment that are present in the first embodiment, the same reference numbers have been utilised in the drawings.

The difference between the first and second embodiments is that the electrical switches 28, 36 have been replaced by triacs 28', 36'. This provides for a simpler design. Furthermore, the use of a triac 36' to control the motor 22 not only enables it to be switched on or off, but also enables its speed to be controlled. Thus, during the operation of the hammer drill, by controlling the operation of the triac using the control logic 26, the speed of the motor is controlled.

In further embodiments of the present invention, other types of electrical or mechanical switching devices to those of relays or triacs can be used, such as transistors, thyristors and FETs in order to suite the type of power supply, the motor and control logic etc.

The invention claimed is:

1. An actuation apparatus for a power tool having a housing, a motor with a rotary output shaft disposed in the housing, drive means for driving a working member of the tool in response to rotation of said rotary output shaft, and a trigger disposed on the housing to enable activation of said motor, the actuation apparatus comprising: switching means for enabling a user to select between a hammer mode of said tool, a drilling mode of said tool and/or a hammer and drilling mode of said tool; detection means for providing at least one signal indicating which mode of operation of the tool has been selected; and control means for controlling operation of the motor in response to at least one said signal, such that in at least one first predetermined mode of operation said motor is operated by a first depression of the trigger and remains activated until deactivated by a second depression and release of the trigger, and in at least one second predetermined mode of operation, said motor is only activated while the trigger is depressed.

2. A method of actuating a multi-mode power tool, the power tool having a housing, a motor with a rotary output shaft disposed in the housing, drive means for driving a working member of the tool in response to rotation of said rotary output shaft, and a trigger disposed on the housing to enable activation of said motor, the actuation method comprising:

providing a mode control switch adapted for enabling a user to select between a first mode of operation in which the working member has a first action and a second mode of operation in which the working member has a second action;

providing a mode selection sensor with a signal indicating which of the first mode or second mode of operation of the tool has been selected; and providing a control circuit for controlling operation of the motor in response to the signal, such that when in the first mode of operation where the working member has a first action, a user operates the motor by a first depression of the trigger and the motor remains activated until it is deactivated by a second depression and release of the trigger, and in the second mode of operation where the working member has a second action, activation of the motor by a user only occurs while the trigger is depressed.

3. An actuation apparatus for a multi-mode power tool having a housing, a motor with a rotary output shaft disposed in the housing, drive means for driving a working member of the tool in response to rotation of said rotary output shaft, and a trigger disposed on the housing to enable activation of said motor, the actuation apparatus comprising:

a mode control switch adapted for enabling a user to select between a first mode of operation in which the working member has a first action and a second mode of operation in which the working member has a second action;

a mode selection sensor for providing a signal indicating which of the first mode or second mode of operation of the tool has been selected; and a control circuit for controlling operation of the motor in response to the signal, such that when in the first mode of operation where the working member has a first action, the motor is operated by a first depression of the trigger and remains activated until deactivated by a second depression and release of the trigger, and in the second mode of operation where the working member has a second action, the motor is only activated while the trigger is depressed.

4. The actuation apparatus of claim 3, further comprising a follower relay interlocked to the on/off switch for providing an electrical signal to the control logic, the electrical signal indicative of the condition of the on/off switch.

5. The actuation apparatus of claim 3, wherein a lock-on switch is connected in parallel with an on/off switch trigger.

6. A hammer drill operable in a first mode of operation and a second mode of operation, the hammer drill comprising:

a housing;

a motor disposed in the housing and supplyable with electric current via a power circuit;

a transmission for driving a working member of the hammer tool in response to rotation of the motor;

an on/off switch located in the power circuit and selectable to one of an on position and an off position, and in the on position the on/off switch conducts electric current to the motor and in the off position the on/off switch does not conduct electric current to the motor;

a trigger disposed on the housing to enable a user to position the on/off switch, a mode control switch disposed in the housing and adapted to enable a user to select one of the first mode of operation in which the working member has a first action and a second mode of operation in which the working member has a second action;

a mode selection sensor providing a first signal indicating which mode of operation of the hammer drill has been selected;

a lock-on switch located in the power circuit and in electrically parallel arrangement to the on/off switch, the lock-on switch selectable to one of an closed position and an open position, and in the closed position the lock-on switch conducts electric current to the motor and in the open position the lock-on switch does not conduct electric current to the motor, a control circuit for positioning the lock-on switch, the control circuit receiving the mode selector sensor first signal, and wherein, when the first mode of operation is selected, a first depression of the trigger will cause the control circuit to position the lock-on switch in the closed position and will maintain the lock-on switch in the closed position after release of the trigger, and a second depression of the trigger will cause the control circuit to position the lock-on switch in the open position.

7. A hammer drill according to claim 6 wherein, when in the second mode of operation, the motor is supplied with electric current only while the trigger is depressed.

8. A hammer drill according to claim 7 wherein, the lock-on switch is in the open position whenever the mode selector switch is selected to the second mode of operation.

9. A hammer drill according to claim 6 wherein the first mode of operation is a hammer-only mode.

10. A hammer drill according to claim 6 and further comprising a follower relay interlocked with the on/off switch, the follower relay providing a second signal to the control circuit, the second signal indicating the position of the on-off switch.

11. A hammer drill according to claim 10 wherein, depressing the trigger will cause the follower relay to send the second signal to the control circuit.

12. A hammer according to claim 11 wherein, when the first signal indicates that the mode selector switch is selected to the first mode, a first sequential receipt of the second signal by the control circuit will cause the control circuit to place the lock-on switch in the closed position, and a second sequential receipt of the second signal by the control circuit will cause the control circuit to place the lock-on switch in the open position.

13. A hammer drill according to claim 6, wherein the lock-on switch comprises one of the group consisting of: a triac, a thyristor, a transistor, an FET, and a relay.

* * * * *